United States Patent
Hao et al.

(10) Patent No.: US 12,471,011 B2
(45) Date of Patent: Nov. 11, 2025

(54) CELL ACCESS METHOD AND APPARATUS

(71) Applicant: HUAWEI TECHNOLOGIES CO., LTD., Guangdong (CN)

(72) Inventors: Jinping Hao, Shanghai (CN); Yinghao Jin, Boulogne Billancourt (FR); Rui Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 370 days.

(21) Appl. No.: 18/152,512

(22) Filed: Jan. 10, 2023

(65) Prior Publication Data

US 2023/0164680 A1    May 25, 2023

Related U.S. Application Data

(63) Continuation of application No. PCT/CN2021/101374, filed on Jun. 22, 2021.

(30) Foreign Application Priority Data

Jul. 10, 2020   (CN) .......................... 202010663854.3

(51) Int. Cl.
*H04W 48/16* (2009.01)
*H04W 48/08* (2009.01)
*H04W 48/20* (2009.01)

(52) U.S. Cl.
CPC .......... *H04W 48/16* (2013.01); *H04W 48/08* (2013.01); *H04W 48/20* (2013.01)

(58) Field of Classification Search
CPC ..... H04L 5/001; H04L 5/0094; H04L 5/0048; H04W 52/0229; H04W 52/0235; H04W 52/0245; H04W 52/0248; H04W 48/12; Y02D 30/70
See application file for complete search history.

(56) References Cited

U.S. PATENT DOCUMENTS 12,192,804 B2 *  1/2025  Han .................... H04B 7/0626
2020/0084748 A1  3/2020  Sadeghi et al.

FOREIGN PATENT DOCUMENTS

| CN | 105009661 A | 10/2015 |
| CN | 105075347 A | 11/2015 |
| EP | 3346769 B1 | 1/2020 |
| WO | 2019083671 A1 | 5/2019 |

OTHER PUBLICATIONS

ZTE, "Consideration on supporting small cell in FeNB-IoT," 3GPP TSG-RAN WG2 Meeting #99bis, R2-1710957, Prague, Czech, Oct. 9-13, 2017, 5 pages.

(Continued)

*Primary Examiner* — Diane D Mizrahi
(74) *Attorney, Agent, or Firm* — Fish & Richardson P.C.

(57) ABSTRACT

Example cell access methods and apparatus are described. In one example method, a terminal device receives a first message in a cell of a first carrier. The first message includes remaining minimum system information (RMSI) of a cell of a second carrier and a first indication, and the first indication indicates information about a first bandwidth part (BWP). The terminal device accesses the cell of the second carrier based on the first BWP and the RMSI.

20 Claims, 5 Drawing Sheets

(56) References Cited

OTHER PUBLICATIONS

Extended European Search Report in European Appln No. 21838504.5, dated Nov. 22, 2023, 10 pages.
Qualcomm Incorporated, "Considerations on CC and BWP in NR," 3GPP TSG-RAN WG2 Meeting #99bis, R2-1711364, Prague, Czech, Oct. 9-13, 2017, 5 pages.
International Search Report and Written Opinion in International Appln. No. PCT/CN2021/101374, mailed on Sep. 26, 2021, 15 pages (with English translation).

* cited by examiner

CELL ACCESS METHOD AND APPARATUS

CROSS-REFERENCE TO RELATED APPLICATIONS

This application is a continuation of International Application No. PCT/CN2021/101374, filed on Jun. 22, 2021, which claims priority to Chinese Patent Application No. 202010663854.3, filed on Jul. 10, 2020. The disclosures of the aforementioned applications are hereby incorporated by reference in their entireties.

TECHNICAL FIELD

This application relates to the communication field, and more specifically, to a cell access method and apparatus.

BACKGROUND

Carrier aggregation (CA) is introduced to meet higher service rate requirements. To be specific, a plurality of contiguous or non-contiguous component carriers (CCs) are aggregated to provide a larger bandwidth. This effectively increases uplink and downlink transmission rates. Each CC on which CA is performed is represented as an independent cell having its own independent cell ID.

A base station periodically broadcasts common signaling on a carrier. A terminal obtains related information of a to-be-accessed cell by receiving the common signaling broadcast by the base station, to perform cell access. At present, when the terminal is in coverage of a carrier in an energy saving state, the terminal can only first access a cell of a carrier not in the energy saving state, and then is handed over from the cell of the carrier not in the energy saving state to a cell of the carrier in the energy saving state. As a result, it takes an excessively long time for the terminal to access the cell of the carrier in the energy saving state, and therefore services and performance cannot be ensured.

SUMMARY

In view of this, this application provides a cell access method and apparatus, to help ensure services and performance of a terminal device.

According to a first aspect, a cell access method is provided. The method may be performed by a terminal device, or may be performed by an apparatus (for example, one or more of a chip, a processor, or a chip system) in the terminal device. For ease of description, an example in which the terminal device performs the method is used below for description. The method includes: first, the terminal device receives a first message in a cell of a first carrier, where the first message includes remaining minimum system information (RMSI) of a cell of a second carrier and a first indication, and the first indication indicates information about a first bandwidth part (BWP). Then, the terminal device determines the first BWP based on the first indication. Finally, the terminal device accesses the cell of the second carrier based on the first BWP and the RMSI.

In this embodiment of this application, the terminal device can obtain related information of the cell of the second carrier by using the cell of the first carrier, to access the cell of the second carrier without first accessing the cell of the first carrier and then being handed over to the cell of the second carrier. This helps implement quick access to the cell of the second carrier and ensures services and performance of the terminal device.

Optionally, the cell of the first carrier is not in an energy saving state, and the cell of the second carrier is in the energy saving state. Therefore, the terminal device can learn, by using the cell of the carrier not in the energy saving state, access-related information of the cell of the carrier in the energy saving state.

In a possible implementation, the first message further includes identification information of the cell of the second carrier. The terminal device accesses the cell of the second carrier based on the first BWP, the RMSI, and the identification information. For example, the identification information is a PCI. Because an SSB is not broadcast in the cell of the second carrier, the terminal device may further obtain the PCI of the cell of the second carrier based on the first message, to avoid a problem that the PCI cannot be obtained because the SSB is not broadcast in the cell of the second carrier.

The terminal device may determine a frequency location of the first BWP based on the first indication, and then send a preamble in the first BWP to start an access request procedure. The first indication may directly indicate or indirectly indicate the first BWP.

Optionally, the first indication includes frequency information of the second carrier and a frequency offset of the first BWP; the first indication includes frequency information of an SSB of the cell of the second carrier, a first parameter, and a frequency offset of the first BWP, where the first parameter is for determining a starting frequency location of a bandwidth of the second carrier; or the first indication includes a frequency location of the first BWP. Herein, the terminal device may obtain the frequency location of the first BWP in different indication manners of the first indication. Manners are flexible.

In a possible implementation, the method further includes: the terminal device receives a second indication in the cell of the first carrier, where the second indication indicates that the first message is broadcast in the cell of the first carrier, and the second indication is carried in a master information block (MIB) or a system information block (SIB). Therefore, the terminal device may learn, based on the second indication, whether the first message is broadcast in the cell of the first carrier, in other words, learn whether there is a broadcast message including a system message of the second carrier in the cell of the first carrier.

According to a second aspect, a cell access method is provided. The method may be performed by a network device, or may be performed by an apparatus (for example, one or more of a chip, a processor, or a chip system) in the network device. For ease of description, an example in which the network device performs the method is used below for description. The method includes: the network device generates a first message, where the first message includes remaining minimum system information (RMSI) of a cell of a second carrier and a first indication, and the first indication indicates information about a first bandwidth part (BWP). Then, the network device broadcasts the first message on a first carrier.

In this embodiment of this application, the network device broadcasts the RMSI of the second carrier and the first indication in a cell of the first carrier, so that a terminal device can obtain related information of the cell of the second carrier by using the cell of the first carrier, to access the cell of the second carrier without first accessing the cell of the first carrier and then being handed over to the cell of the second carrier. This helps implement quick access to the cell of the second carrier and ensures services and performance of the terminal device.

Optionally, the cell of the first carrier is not in an energy saving state, and the cell of the second carrier is in the energy saving state. Therefore, the network device can broadcast the RMSI of the cell of the carrier in the energy saving state and the first indication by using the cell of the carrier not in the energy saving state.

Optionally, the first message further includes identification information of the cell of the second carrier. For example, the identification information is a PCI. Because an SSB is not broadcast in the cell of the second carrier, the terminal device may further obtain the PCI of the cell of the second carrier based on the first message, to avoid a problem that the PCI cannot be obtained because the SSB is not broadcast in the cell of the second carrier.

The first indication may directly or indirectly indicate the first BWP, so that the terminal device determines a frequency location of the first BWP based on the first indication. Optionally, the first indication includes frequency information of the second carrier and a frequency offset of the first BWP; the first indication includes frequency information of an SSB of the cell of the second carrier, a first parameter, and a frequency offset of the first BWP, where the first parameter is for determining a starting frequency location of a bandwidth of the second carrier; or the first indication includes a frequency location of the first BWP.

In a possible implementation, the method further includes: the network device broadcasts a second indication on the first carrier, where the second indication indicates that the first message is broadcast in the cell of the first carrier, and the second indication is carried in a master information block (MIB) or a system information block (SIB). Therefore, the network device may further broadcast the second indication in the cell of the first carrier, so that the terminal device learns whether the first message is broadcast in the cell of the first carrier, in other words, learns whether there is a broadcast message including a system message of the second carrier in the cell of the first carrier.

According to a third aspect, a cell access method is provided. The method may be performed by a terminal device, or may be performed by an apparatus (for example, one or more of a chip, a processor, or a chip system) in the terminal device. For ease of description, an example in which the terminal device performs the method is used below for description. The method includes: first, the terminal device receives a second message in a cell of a first carrier, where the second message includes remaining minimum system information (RMSI) of a cell of a second carrier and information about a synchronization signal and PBCH block SSB of the cell of the second carrier. The terminal device accesses the cell of the second carrier based on the RMSI and the information about the SSB.

In this embodiment of this application, the terminal device may obtain the RMSI of the cell of the second carrier and the information about the SSB in the cell of the first carrier, and access the cell of the second carrier based on the information about the SSB and the RMSI, without accessing the cell of the second carrier in a handover manner. In this way, the terminal device can quickly access the cell of the second carrier, thereby reducing a delay of accessing the cell of the second carrier, and ensuring services and performance of the terminal device.

Optionally, the terminal device detects the SSB based on the information about the SSB. Therefore, after the information about the SSB is obtained, detection may be performed based on the information about the SSB, so that the SSB can be found more accurately and flexibly. This reduces unnecessary detection, reduces energy consumption, and can avoid a failure of the terminal device in detecting the SSB.

Optionally, the cell of the first carrier is not in an energy saving state, and the cell of the second carrier is in the energy saving state. Therefore, the terminal device can obtain the RMSI of the cell of the carrier in the energy saving state and the information about the SSB by using the cell of the carrier not in the energy saving state.

Optionally, the information about the SSB includes one or more of the following: a period of the SSB, a frequency of the SSB, and a carrier spacing of the SSB.

Optionally, the second message further includes identification information of the cell of the second carrier. The terminal device accesses the cell of the second carrier based on the RMSI, the SSB, and the identification information. Therefore, the terminal device can learn, based on the identification information (for example, a PCI) of the cell of the second carrier, a cell to be accessed.

In a possible implementation, the method further includes: the terminal device receives a third indication in the cell of the first carrier, where the third indication indicates that the second message is broadcast in the cell of the first carrier, and the third indication is carried in a master information block (MIB) or a system information block (SIB). Therefore, after the third indication is introduced, the terminal device may learn, based on the third indication, whether the second message is broadcast in the cell of the first carrier, in other words, learn whether there is a broadcast message including a system message of the second carrier in the cell of the first carrier.

According to a fourth aspect, a cell access method is provided. The method may be performed by a network device, or may be performed by an apparatus (for example, one or more of a chip, a processor, or a chip system) in the network device. For ease of description, an example in which the network device performs the method is used below for description. The method includes: the network device generates a second message, where the second message includes remaining minimum system information (RMSI) of a cell of a second carrier and information about a synchronization signal and PBCH block (SSB) of the cell of the second carrier; and broadcasts the second message on a first carrier.

In this embodiment of this application, the network device broadcasts the RMSI of the cell of the second carrier and the information about the SSB in a cell of the first carrier, so that a terminal device performs SSB detection based on the information about the SSB, and accesses the cell of the second carrier based on the SSB and the RMSI, without accessing the cell of the second carrier in a handover manner. In this way, the terminal device can quickly access the cell of the second carrier, thereby reducing a delay of accessing the cell of the second carrier, and ensuring services and performance of the terminal device.

Optionally, the cell of the first carrier is not in an energy saving state, and the cell of the second carrier is in the energy saving state. Therefore, the network device can broadcast the RMSI of the cell of the carrier in the energy saving state and the information about the SSB by using the cell of the carrier not in the energy saving state.

Optionally, the information about the SSB includes one or more of the following: a period of the SSB, a frequency of the SSB, and a carrier spacing of the SSB.

Optionally, the second message further includes identification information of the cell of the second carrier. In this way, the terminal device can learn, based on the identification information (for example, a PCI) of the cell of the second carrier, a cell to be accessed.

In a possible implementation, the method further includes: the network device broadcasts a third indication on the first carrier, where the third indication indicates that the second message is broadcast in the cell of the first carrier, and the third indication is carried in a master information block (MIB) or a system information block (SIB). Therefore, the network device may further broadcast the third indication in the cell of the first carrier, so that the terminal device learns whether the second message is broadcast in the cell of the first carrier.

According to a fifth aspect, a communication apparatus is provided. The communication apparatus includes a unit configured to perform the method in the first aspect or any possible implementation of the first aspect, a unit configured to perform the method in the second aspect or any possible implementation of the second aspect, a unit configured to perform the method in the third aspect or any possible implementation of the third aspect, or a unit configured to perform the method in the fourth aspect or any possible implementation of the fourth aspect.

According to a sixth aspect, a cell access apparatus is provided, and includes a processor. The processor is coupled to a memory, and may be configured to execute instructions in the memory, to implement the method according to any possible implementation of the first aspect or the third aspect. Optionally, the apparatus further includes the memory. Optionally, the apparatus further includes a communication interface, and the processor is coupled to the communication interface.

In an implementation, the apparatus is a terminal device. When the apparatus is the terminal device, the communication interface may be a transceiver or an input/output interface.

In another implementation, the apparatus is a chip disposed in a terminal device. When the apparatus is the chip disposed in the terminal device, the communication interface may be an input/output interface.

Optionally, the transceiver may be a transceiver circuit. Optionally, the input/output interface may be an input/output circuit.

According to a seventh aspect, a cell access apparatus is provided, and includes a processor. The processor is coupled to a memory, and may be configured to execute instructions in the memory, to implement the method according to any possible implementation of the second aspect or the fourth aspect. Optionally, the apparatus further includes the memory. Optionally, the apparatus further includes a communication interface, and the processor is coupled to the communication interface.

In an implementation, the apparatus is a network device. When the apparatus is the network device, the communication interface may be a transceiver or an input/output interface.

In another implementation, the apparatus is a chip disposed in a network device. When the apparatus is the chip disposed in the network device, the communication interface may be an input/output interface.

Optionally, the transceiver may be a transceiver circuit. Optionally, the input/output interface may be an input/output circuit.

According to an eighth aspect, a processor is provided. The processor includes an input circuit, an output circuit, and a processing circuit. The processing circuit is configured to: receive a signal via the input circuit, and transmit a signal via the output circuit, so that the processor is enabled to perform the method according to any one of the first aspect to the fourth aspect and the possible implementations of the first aspect to the fourth aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to a ninth aspect, an apparatus is provided. The apparatus includes a processor and a memory. The processor is configured to read instructions stored in the memory, receive a signal through a receiver, and transmit a signal through a transmitter, to perform the method in any possible implementation of any one of the first aspect to the fourth aspect.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be separately disposed in different chips. A type of the memory and a manner in which the memory and the processor are disposed are not limited in this embodiment of this application.

It should be understood that, a related data exchange process, for example, sending of information may be a process of outputting the information from the processor, and receiving of information may be a process of receiving the input information by the processor. Specifically, data output by the processor may be output to a transmitter, and input data received by the processor may be from a receiver. The transmitter and the receiver may be collectively referred to as a transceiver.

The apparatus according to the ninth aspect may be a chip, and the processor may be implemented by using hardware or software. When implemented by using hardware, the processor may be a logic circuit, an integrated circuit, or the like. When implemented by using software, the processor may be a general-purpose processor, and is implemented by reading software code stored in the memory. The memory may be integrated into the processor, or may be independently located outside the processor.

According to a tenth aspect, a computer-readable storage medium is provided. The computer-readable storage medium stores a computer program or instructions. When the computer program or the instructions are executed, the method in any possible implementation of any one of the first aspect to the fourth aspect is implemented.

According to an eleventh aspect, a computer program product including instructions is provided. When the instructions are run, the method in any possible implementation of any one of the first aspect to the fourth aspect is implemented.

According to a twelfth aspect, a communication chip is provided, where the communication chip stores instructions. When the instructions run on a computer device, the communication chip is enabled to perform the method in the first aspect or any possible implementation of the first aspect, or the communication chip is enabled to perform the method in the third aspect or any possible implementation of the third aspect.

According to a thirteenth aspect, a communication chip is provided, where the communication chip stores instructions. When the instructions run on a computer device, the communication chip is enabled to perform the method in the second aspect or any possible implementation of the second aspect, or the communication chip is enabled to perform the method in the fourth aspect or any possible implementation of the fourth aspect.

According to a fourteenth aspect, a communication system is provided. The communication system includes a terminal device and a network device.

Optionally, the communication system further includes another device that communicates with the terminal device and/or the network device.

DESCRIPTION OF EMBODIMENTS

The following describes technical solutions of this application with reference to accompanying drawings.

In embodiments of this application, "a plurality of" may be understood as "at least two", and "a plurality of items" may be understood as "at least two items".

The technical solutions in embodiments of this application may be applied to various communication systems, for example, a long term evolution (LTE) system, a new radio (NR) system in a fifth generation (5G) mobile communication system, and a future mobile communication system.

Figure 1:
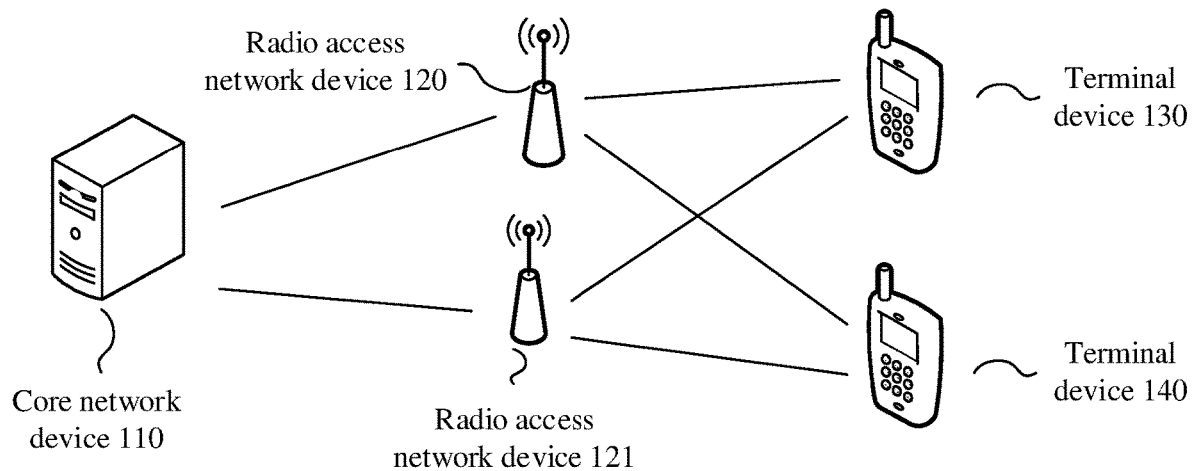
FIG. 1 is a schematic diagram of an architecture of a communication system to which an embodiment of this application is possibly applied.

FIG. 1 is a schematic diagram of an architecture of a mobile communication system to which an embodiment of this application is applied. As shown in FIG. 1, the mobile communication system includes a core network device 110, at least one (for example, a radio access network device 120 and a radio access network device 121 in FIG. 1), and at least one terminal device (for example, a terminal device 130 and a terminal device 140 in FIG. 1). The terminal device is connected to the radio access network device in a wireless manner, and the radio access network device is connected to the core network device in a wireless or wired manner. The core network device and the radio access network device may be independent and different physical devices, or a function of the core network device and a logical function of the radio access network device may be integrated into a same physical device, or a part of functions of the core network device and a part of functions of the radio access network device may be integrated into one physical device. The terminal device may be located at a fixed position, or may be mobile. FIG. 1 is only a schematic diagram. The communication system may further include another network device, for example, may further include a wireless relay device and a wireless backhaul device, which are not shown in FIG. 1. Quantities of core network devices, radio access network devices, and terminal devices included in the mobile communication system are not limited in this embodiment of this application.

The radio access network device in FIG. 1 may correspond to one or more carriers, that is, may perform communication on one or more carriers. This is not limited herein.

The radio access network (RAN) device is an access device used by the terminal device to access the mobile communication system in a wireless manner, and may be a NodeB, an evolved NodeB (eNB), a next generation NodeB (gNB) in a 5G mobile communication system, a transmission point, a base station in a future mobile communication system, an access node in a Wi-Fi system, or one antenna panel or a plurality of antenna panels of a base station in a 5G system. Alternatively, the radio access network device may be a network node, such as a baseband unit (BBU) or a distributed unit (DU), that constitutes a gNB or a transmission point. A specific technology and a specific device form that are used by the radio access network device are not limited in embodiments of this application. In some deployments, the gNB may include a central unit (CU) and a DU, and the CU and the DU separately implement some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The gNB may further include an active antenna unit (AAU). The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be used as a network device in an access network, or may be used as a network device in the core network (CN). This is not limited in this application.

The terminal device may also be referred to as a terminal, user equipment (UE), a mobile station, a mobile terminal, or the like. The terminal device may be a mobile phone, a tablet computer, a computer having a wireless transceiver function, a virtual reality terminal device, an augmented reality terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or the like. A specific technology and a specific device form that are used by the terminal device are not limited in embodiments of this application.

The radio access network device and the terminal device may be deployed on land, including indoors or outdoors, or handheld or vehicle-mounted; may be deployed on water; or may be deployed on an airplane, a balloon, and a satellite in the air. Application scenarios of the radio access network device and the terminal device are not limited in this embodiment of this application.

Communication between the radio access network device and the terminal device and communication between terminal devices may be performed by using a licensed spectrum, may be performed by using an unlicensed spectrum, or may be performed by using both of a licensed spectrum and an unlicensed spectrum. Communication between the radio access network device and the terminal device and communication between the terminal devices may be performed by using a spectrum below 6 gigahertz (GHz), or a spectrum above 6G, or both a spectrum below 6G and a spectrum above 6G. Spectrum resources used by the radio access network device and the terminal device are not limited in this embodiment of this application.

In the embodiments of this application, unless otherwise specified, the network device is a radio access network device. The terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not specifically limited in the embodiments of this application provided that a program that records code for the method provided in the embodiments of this application can be run to perform communication according to the method provided in the embodiments of this application. For example, the method provided in the embodiments of this application may be performed by the terminal device, the network device, or a function module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (, EPROM), a card, a stick, or a key drive). In addition, various storage media described in this specification may represent one or more devices and/or other machine-readable media that are configured to store information. The term "machine readable media" may include but is not limited to a radio channel, and various other media that can store, contain and/or carry instructions and/or data.

Before embodiments of this application are described, for ease of understanding, terms or concepts used in embodiments of this application are briefly explained herein.

One carrier may correspond to one or more cells. A network device of a cell may broadcast a system message.

A public broadcast message (or public broadcast signaling) of a carrier includes at least a synchronization signal and PBCH block (SSB), remaining minimum system information (RMSI), and a paging signal. A carrier in an energy saving state may not send the SSB, the RMSI, or the paging signal; or the carrier in the energy saving state may send only the SSB, and does not send the RMSI or the paging signal. A cell of the carrier in the energy saving state may be scheduled at any time for sending data. However, because no RMSI is sent in the cell of the carrier in the energy saving state, a terminal device cannot obtain sufficient information. Consequently, the terminal device cannot access the cell of the carrier in the energy saving state through an initial access procedure. In other words, if the carrier is in the energy saving state or an energy saving measure is implemented, for example, the cell of the carrier in the energy saving state does not send a public broadcast message or sends only the SSB, the terminal device cannot receive the public broadcast message from the cell of the carrier in the energy saving state, cannot obtain related information (for example, a system information block (SIB) 1) for accessing the cell of the carrier in the energy saving state, and cannot access the cell of the carrier in the energy saving state.

Generally, the carrier in the energy saving state may be a high-frequency large-bandwidth carrier, and a carrier not in the energy saving state may be a low-frequency wide-coverage carrier.

The synchronization signal and PBCH block SSB includes a synchronization signal and a physical broadcast channel (PBCH). The SSB is periodically sent.

The synchronization signal includes a primary synchronization signal (PSS) and a secondary synchronization signal (SSS). The synchronization signal is for time-frequency synchronization. Cell signal quality (for example, RSRP/RSRQ/RS-SINR) measurement is implemented mainly through SSS signal measurement.

A master information block (MIB) is a master broadcast information block on a PBCH of the SSB.

The remaining minimum system information (RMSI) is a system message necessary for the terminal device in an access process. The RMSI is periodically sent with a period aligned with an SSB period. Content included in the RMSI is a system information block SIB1. The SIB1 mainly includes cell configuration information, cell selection information, access information, system information scheduling information, and the like.

Figure 2:
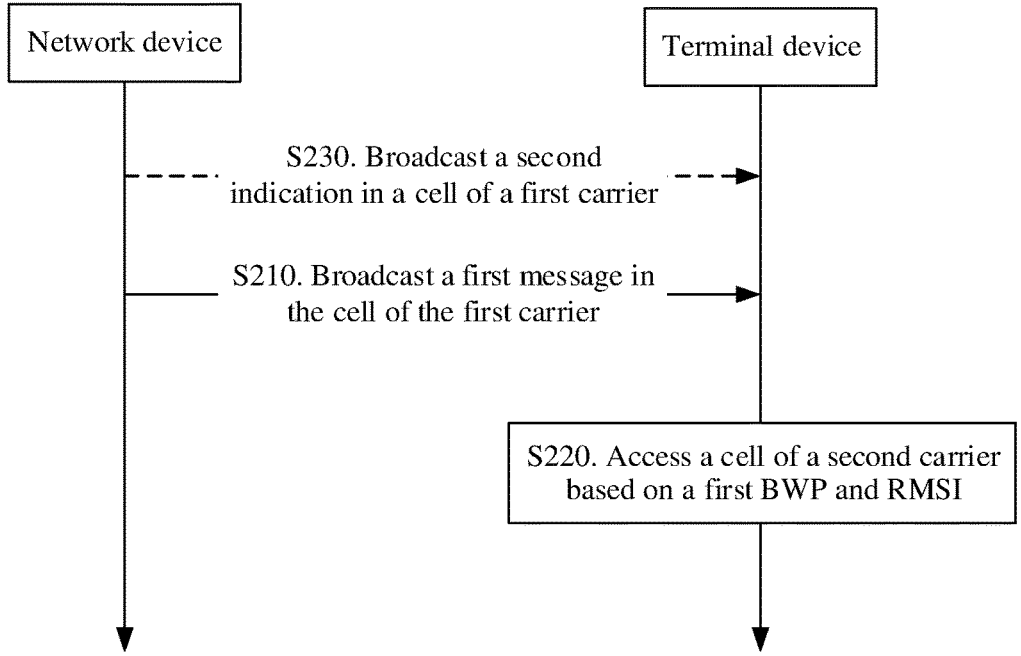
FIG. 2 is a schematic interaction diagram of a cell access method according to an embodiment of this application.
Figure 3:
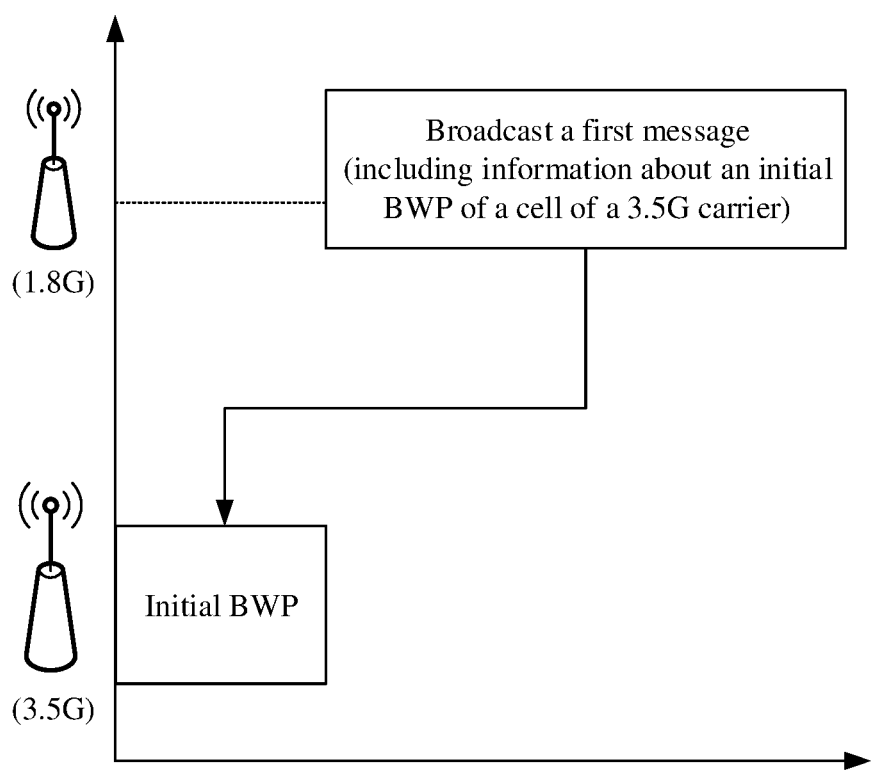
FIG. 3 is a diagram of an example to which an embodiment of this application is applied.
Figure 4:
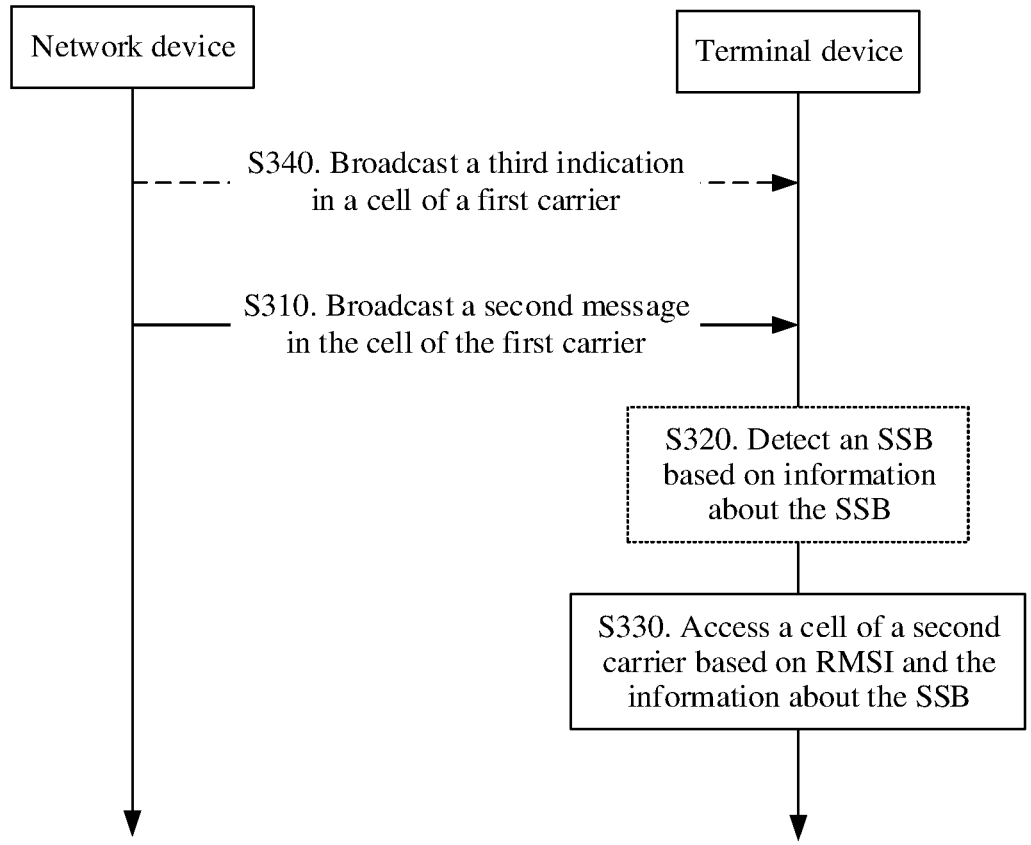
FIG. 4 is a schematic interaction diagram of a cell access method according to another embodiment of this application.

The following describes a cell access method in embodiments of this application with reference to FIG. 2 to FIG. 4.

FIG. 2 is a schematic flowchart of a cell access method 200 according to an embodiment of this application. The method in FIG. 2 may be applied to a case in which one network device corresponds to two carriers. For example, in FIG. 2, the network device may be the radio access network device 120 in FIG. 1, and a terminal device may be the terminal device 140 in FIG. 1. As shown in FIG. 2, the method 200 includes the following steps.

S210. The terminal device receives a first message in a cell of a first carrier, where the first message includes remaining minimum system information (RMSI) of a cell of a second carrier and a first indication, and the first indication indicates information about a first bandwidth part (BWP).

The network device may broadcast the first message in the cell of the first carrier. Correspondingly, the terminal device receives the first message in the cell of the first carrier.

A unified description is provided herein. The first carrier in this application is a carrier not in an energy saving state, and the second carrier in this application is a carrier in the energy saving state. Correspondingly, the cell of the first carrier is not in the energy saving state, and the cell of the second carrier is in the energy saving state.

The first BWP is an initial BWP, and is for receiving information before the terminal device accesses the cell of the second carrier. For example, the first BWP is for receiving a SIB and random access (RA) related information.

The first message is a broadcast message of the first carrier. The first message may include a public broadcast message corresponding to the cell of the second carrier. For example, the public broadcast message corresponding to the cell of the second carrier is a SIB1 message. The terminal device may obtain, based on the broadcast message of the cell of the first carrier, related information of the cell of the second carrier (or information required by the terminal device to access the cell of the second carrier), for example, the RMSI of the cell of the second carrier and the first indication. In other words, RMSI of an inter-frequency cell and related information of an initial BWP of the inter-frequency cell are broadcast in the cell of the first carrier.

In this embodiment of this application, the first indication may indirectly or directly indicate the first BWP, or implicitly or explicitly indicate the first BWP. The terminal device can determine a frequency location of the first BWP based on the first indication.

S220. The terminal device accesses the cell of the second carrier based on the first BWP and the RMSI.

Specifically, a procedure in which the terminal device accesses the cell of the second carrier includes: The terminal device sends a random access preamble on the first BWP, to initiate random access. After the preamble is sent on the first BWP, for a subsequent procedure in which the terminal device accesses the cell of the second carrier, refer to a random access procedure in a standard protocol. Details are not described herein. For example, after sending the preamble, the terminal device receives a random access response message sent by the network device (where the network device corresponds to the cell of the second carrier); the terminal device sends a message 3 (Msg3) on an uplink resource allocated based on a message 2 (Msg2); the network device replies to the terminal device with an RRC setup message; and the terminal device successfully accesses the network device and sends an RRC setup complete message.

In this embodiment of this application, the terminal device can obtain the RMSI of the cell of the second carrier and the first indication in the cell of the first carrier, and access the cell of the second carrier based on the first BWP and the RMSI, without accessing the cell of the second carrier in a handover manner. In this way, the terminal device can quickly access the cell of the second carrier, thereby reducing a delay of accessing the cell of the second carrier, and ensuring services and performance of the terminal device.

The first indication may indicate the information about the first BWP in different implementations. The terminal device may determine the frequency location of the first BWP based on the first indication.

Implementation 1: The first indication includes the frequency location of the first BWP.

Specifically, the first indication may directly indicate the frequency location (that is, an absolute frequency of the initial BWP) and a bandwidth of the first BWP. In other words, the terminal device may directly obtain the frequency location of the first BWP based on the first indication, and then access the cell of the second carrier based on the first BWP and the RMSI.

Implementation 2: The first indication includes frequency information of the second carrier and a frequency offset of the first BWP.

An example in which the first BWP is the initial BWP is used for description. The first indication includes the following information: an absolute frequency (or a starting frequency location) of the second carrier and a frequency offset of the initial BWP. In other words, the terminal device obtains a frequency location of the initial BWP based on the starting frequency location of the second carrier and the frequency offset of the initial BWP.

Implementation 3: The first indication includes frequency information of an SSB of the cell of the second carrier, a first parameter, and a frequency offset of the first BWP, where the first parameter is for determining a starting frequency location of a bandwidth of the second carrier. For example, the first parameter is K-ssb, and is for determining a starting location of a carrier bandwidth.

For example, the first indication may include the following information: an absolute frequency of the SSB of the cell of the second carrier, K-ssb, and a frequency offset of the initial BWP. The terminal device determines a starting location of the carrier based on the absolute frequency of the SSB and the parameter K-ssb, and then determines a frequency location of the initial BWP based on the frequency offset of the initial BWP after determining the starting location of the carrier. After the frequency location of the initial BWP is obtained, the cell of the second carrier is accessed based on the initial BWP and the RMSI.

In other words, the foregoing three implementations are all for determining the frequency location of the first BWP. The terminal device may obtain the first indication from the first message, determine the initial BWP based on the first indication, and send a preamble on the initial BWP, to start an access request procedure.

It may be understood that the foregoing three implementations are merely examples for description, and do not constitute a limitation on this embodiment of this application. Actually, there is another appropriate manner of indicating the first BWP.

The terminal device may further learn of identification information of the cell of the second carrier by using the cell of the first carrier. Optionally, the first message may further include the identification information of the cell of the second carrier. In other words, because the SSB is not broadcast in the cell of the second carrier, the terminal device obtains the identification information of the cell of the second carrier from the first message received in the cell of the first carrier, to avoid a problem that the terminal device cannot obtain the identification information of the cell of the second carrier because the SSB is not broadcast in the cell of the second carrier. The identification information of the cell of the second carrier includes information, for example, a physical cell identifier (, PCI), for identifying the cell of the second carrier. Certainly, regardless of which of the foregoing implementations in which the first indication indicates the first BWP is used, the first message may further include the identification information of the cell of the second carrier.

The terminal device may further learn, by using the cell of the first carrier, whether the first message is broadcast in the cell of the first carrier, that is, whether a system broadcast message of the cell of the second carrier can be learned of by using the cell of the first carrier.

Optionally, the method 200 further includes: S230. The network device broadcasts a second indication in the cell of the first carrier. Correspondingly, the terminal device receives the second indication in the cell of the first carrier. The second indication indicates that the first message is broadcast in the cell of the first carrier (or indicates whether the first message exists in the cell of the first carrier, or indicates whether access information of the cell of the second carrier exists in the cell of the first carrier), and the second indication is carried in a master information block (MIB) or a system information block (SIB). The second indication is carried in a SIB1 or a MIB of the first carrier. For example, the second indication may be represented by one bit. When a value of the bit is 1, it indicates that the first message is broadcast in the cell of the first carrier. When the value of the bit is 0, it indicates that the first message is not broadcast in the cell of the first carrier. It may be understood that a meaning represented by the bit value herein is merely an example for description, and constitutes no limitation on this embodiment of this application.

Therefore, based on the introduced second indication, the terminal device may determine whether the first message is broadcast in the cell of the first carrier, that is, whether a broadcast message including a system message of the second carrier exists. In addition, the introduced second indication may be carried in a broadcast message of the cell of the first carrier, to avoid introducing new signaling or a new message. This reduces overheads. Alternatively, the second indication may be carried in a newly defined message. This is not specifically limited herein.

It should be understood that a sequence of performing S230 and S210 is not specifically limited in this application. For example, S230 may be performed before S210.

An example in FIG. 3 is used as an example. It is assumed that the first carrier is a low-frequency carrier, for example, a frequency of 1.8G, and the second carrier is a high-frequency large-bandwidth carrier, for example, a frequency of 3.5G. According to the cell access method in this application, as shown in FIG. 3, the first message is broadcast in a cell of a 1.8G carrier, and the first message includes information about an initial BWP of a cell of a 3.5G carrier. In this way, by receiving the first message broadcast in the cell of the 1.8G carrier, the terminal device may obtain the information about the initial BWP of the cell of the 3.5G carrier, and send a random access preamble on the initial BWP, to access the cell of the 3.5G carrier. It should be understood that the example in FIG. 3 is merely for ease of understanding, and does not constitute a limitation on this embodiment of this application.

This application further provides a cell access method. A terminal device obtains RMSI of a cell of a second carrier and SSB information in a cell of a first carrier, to access the cell of the second carrier.

FIG. 4 is a schematic flowchart of a cell access method 300 according to an embodiment of this application. The method in FIG. 4 may be applied to a case in which one network device corresponds to two carriers, or may be applied to a case in which two network devices each correspond to one carrier. This is not limited herein. For example, in FIG. 4, the network device may be the radio access network device 120 or the radio access network device 121 in FIG. 1, and a terminal device may be the terminal device 140 in FIG. 1. As shown in FIG. 4, the method 300 includes the following steps.

S310. The network device broadcasts a second message in a cell of a first carrier. Correspondingly, the terminal device receives the second message in the cell of the first carrier, where the second message includes remaining minimum system information RMSI of the cell of the second carrier and information about a synchronization signal and PBCH block SSB of the cell of the second carrier.

The second message may include a public broadcast message corresponding to the cell of the second carrier, for example, a SIB1 message. The terminal device may obtain, the cell of the first carrier, related information of the cell of the second carrier (or information required by the terminal device to access the cell of the second carrier), for example, the RMSI of the cell of the second carrier and the information about the SSB. A difference from the first message in the method 200 lies in that the second message does not need to carry first indication, that is, information about a first BWP, but carries the information about the SSB. The terminal device performs SSB detection based on the SSB information, and may learn of the first BWP based on the SIB1 message.

Optionally, the information about the SSB includes one or more of the following: a period of the SSB, a frequency of the SSB, and a carrier spacing of the SSB. The period of the SSB may be prolonged to meet an energy saving requirement. For example, the period of the SSB is 160 ms or longer. For example, the terminal device may perform SSB detection based on the period of the SSB.

S320. The terminal device detects the SSB based on the information about the SSB.

For example, the cell of the first carrier is a cell in which the radio access network device 120 is located, and the cell of the second carrier may be a cell in which the radio access network device 121 is located. An SSB is broadcast in the cell in which the radio access network device 121 is located. The terminal device 140 obtains information about the SSB by using the cell in which the radio access network device 120 is located, and searches for the SSB in the cell in which the radio access network device 121 is located, so that the SSB can be found more accurately and flexibly. This reduces unnecessary detection.

In this embodiment of this application, the SSB is broadcast in the cell of the second carrier. Therefore, after obtaining the information about the SSB, the terminal device may perform detection based on the information about the SSB, so that the SSB can be found more accurately and flexibly. This reduces unnecessary detection, reduces energy consumption, and can avoid a failure of the terminal device in detecting the SSB.

S330. The terminal device accesses the cell of the second carrier based on the RMSI and the information about the SSB.

It should be understood that step S320 may be optional. The terminal device may access the cell of the second carrier based on the RMSI and the information about the SSB.

If step S320 is included, the terminal device performs step S320, to be specific, performs SSB detection based on the information about the SSB. After detecting the SSB based on the information about the SSB, the terminal device may access the cell of the second carrier based on the SSB and the RMSI.

In this embodiment of this application, the terminal device obtains the RMSI of the cell of the second carrier and the information about the SSB in the cell of the first carrier, performs SSB detection based on the information about the SSB, and finally accesses the cell of the second carrier based on the SSB and the RMSI, without accessing the cell of the second carrier in a handover manner. In this way, the terminal device can quickly access the cell of the second carrier, thereby reducing a delay of accessing the cell of the second carrier, and ensuring services and performance of the terminal device. In addition, the information about the SSB is provided, so that the SSB can be found more accurately. This reduces unnecessary detection and reduces energy consumption.

Similarly, in this embodiment of this application, the terminal device may further learn of identification information of the cell of the second carrier by using the cell of the first carrier. Optionally, the second message further includes the identification information of the cell of the second carrier. S330 includes: the terminal device accesses the cell of the second carrier based on the RMSI, the SSB, and the identification information.

The identification information of the cell of the second carrier includes information for identifying the cell of the second carrier, for example, a PCI. After obtaining the identification information of the cell of the second carrier, the terminal device may find the cell of the second carrier based on the identification information, and access the cell of the second carrier based on the SSB and the RMSI.

Similarly, the terminal device may further learn, by using the cell of the first carrier, whether the second message is broadcast in the cell of the first carrier (or whether a broadcast message including a system message of the cell of the second carrier exists), to be specific, whether a system broadcast message of the cell of the second carrier can be learned of by using the cell of the first carrier.

Optionally, the method 300 further includes: S340. The network device broadcasts a third indication in the cell of the first carrier. Correspondingly, the terminal device receives the third indication in the cell of the first carrier. The third indication indicates that the second message is broadcast in the cell of the first carrier, and the third indication is carried in a master information block (MIB) or a system information block (SIB).

The third indication is carried in a SIB1 or a MIB of the first carrier. For example, the third indication may be represented by one bit. When a value of the bit is 1, it indicates that the second message is broadcast in the cell of the first carrier. When the value of the bit is 0, it indicates that the second message is not broadcast in the cell of the first carrier. It may be understood that a meaning represented by the bit value herein is merely an example for description, and constitutes no limitation on this embodiment of this application.

Therefore, based on the introduced third indication, the terminal device can determine whether the broadcast message including the system message of the cell of the second carrier exists in the cell of the first carrier. In addition, the introduced third indication may be carried in a broadcast message of the cell of the first carrier, to avoid introducing new signaling or a new message. This reduces overheads. Alternatively, the third indication may be carried in a newly defined message. This is not specifically limited herein.

It should be understood that a sequence of performing S340 and S310 is not specifically limited in this application. For example, S340 may be performed before S310.

It may be understood that, in some scenarios, some optional features in the embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in embodiments of this application may also correspondingly implement these features or functions. Details are not described herein.

It may be further understood that the solutions in the embodiments of this application may be appropriately combined for usage, and explanations or description of terms in the embodiments may be mutually referenced or explained in the embodiments. This is not limited.

It may be further understood that sequence numbers of the foregoing processes do not mean execution sequences in various embodiments of this application. The execution sequences of the processes should be determined based on functions and internal logic of the processes. Numbers or sequence numbers in the foregoing processes are merely used for differentiation for ease of description, and should not constitute any limitation on an implementation process of embodiments of this application.

Corresponding to the methods provided in the foregoing method embodiments, an embodiment of this application further provides a corresponding apparatus. The apparatus includes a corresponding unit configured to perform the foregoing embodiments. The unit may be software, hardware, or a combination of software and hardware. It may be understood that the technical features described in the method embodiments are also applicable to the following apparatus embodiments.

Figure 5:
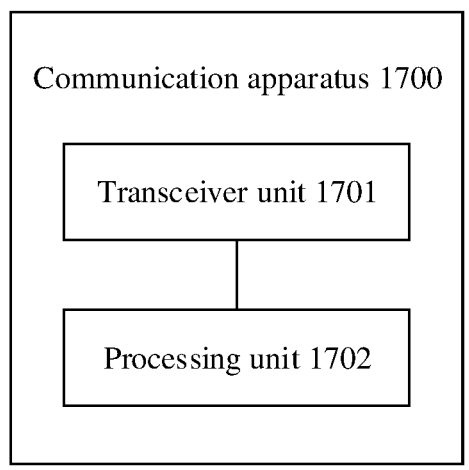
FIG. 5 is a schematic block diagram of a cell access apparatus according to an embodiment of this application.

FIG. 5 is a schematic block diagram of an apparatus according to an embodiment of this application. As shown in FIG. 5, another embodiment of this application provides a communication apparatus 1700. The apparatus may be a terminal device; or may be a component (for example, an integrated circuit or a chip) of the terminal device. Alternatively, the apparatus may be a network device, or may be a component (for example, an integrated circuit or a chip) of the network device. Alternatively, the apparatus may be another communication module configured to implement the method in the method embodiments of this application.

As shown in FIG. 5, the apparatus 1700 may include a transceiver unit 1701 and a processing unit 1702. Optionally, the apparatus 1700 may further include a storage unit. The storage unit may be configured to store instructions or data. The processing unit may invoke the instructions or the data stored in the storage unit, to implement a corresponding operation. The storage unit may be implemented by at least one memory.

The transceiver unit 1701 may also be referred to as a transceiver, a transceiver machine, a transceiver apparatus, or the like. The processing unit 1702 may be a processor. The transceiver unit 1701 has both receiving and sending functions, and may include a receiving unit (corresponding to the receiving function) and a sending unit (corresponding to the sending function). For example, the receiving unit may also be referred to as a receiver machine, a receiver, or a receiver circuit, and the sending unit may also be referred to as a transmitter machine, a transmitter, or a transmitter circuit. Optionally, the receiving unit and the sending unit may be one integrated unit, or may be a plurality of independent units. The receiving unit and the sending unit may be in one geographical position, or may be distributed in a plurality of geographical positions.

In a possible design, one or more modules in FIG. 5 may be implemented by one or more processors, may be implemented by one or more processors and memories, may be implemented by one or more processors and transceivers, or may be implemented by one or more processors, memories, and transceivers. This is not limited in this embodiment of this application. The processor, the memory, and the transceiver may be disposed separately, or may be integrated.

The apparatus has a function of implementing the terminal device described in embodiments of this application. For example, the apparatus includes a corresponding module, unit, or means used for the terminal device to perform the steps related to the terminal device and described in embodiments of this application. The function, the unit, or the means may be implemented by software or hardware, may be implemented by hardware executing corresponding software, or may be implemented by a combination of software and hardware. For details, refer to the corresponding descriptions in the foregoing corresponding method embodiment. It may be understood that, when the apparatus 1700 is a terminal device, the transceiver unit 1701 may correspond to a transceiver 2020 in FIG. 6, and the processing unit 1702 may correspond to a processor 2010 in a terminal device 2000 shown in FIG. 6. It should be understood that, when the communication apparatus 1700 is a chip disposed in a terminal device, the transceiver unit 1701 in the communication apparatus 1700 may be an input/output interface circuit. Optionally, if the communication apparatus 1700 further includes a storage unit, the storage unit may be implemented by using at least one memory, for example, may correspond to a memory 2030 in the terminal device 2000 in FIG. 6.

Alternatively, the apparatus has a function of implementing the network device described in embodiments of this application. For example, the apparatus includes a corresponding module, unit, or means used for the network device to perform the steps related to the network device and described in embodiments of this application. The function, the unit, or the means may be implemented by software or hardware, may be implemented by hardware executing corresponding software, or may be implemented by a combination of software and hardware. For details, refer to the corresponding descriptions in the foregoing corresponding method embodiment. It may be understood that, when the apparatus 1700 is a network device, the transceiver unit 1701 may correspond to a transceiver unit 1101 in FIG. 7, and the processing unit 1702 may correspond to a processing unit 1102 in a network device 1100 shown in FIG. 7. Optionally, if the communication apparatus 1700 further includes a storage unit, the storage unit may be implemented by using at least one memory, for example, may correspond to a memory in FIG. 7.

In a possible implementation, the apparatus 1700 may include: the transceiver unit 1701, configured to receive a first message in a cell of a first carrier, where the first message includes remaining minimum system information RMSI of a cell of a second carrier and a first indication, and the first indication indicates information about a first bandwidth part BWP; and the processing unit 1702, configured to access the cell of the second carrier based on the first BWP and the RMSI.

Optionally, the cell of the first carrier is not in an energy saving state, and the cell of the second carrier is in the energy saving state.

Optionally, the identification information of the cell of the second carrier. That the processing unit 1702 is configured to access the cell of the second carrier based on the first BWP and the RMSI includes: accessing the cell of the second carrier based on the first BWP, the RMSI, and the identification information.

Optionally, the first indication includes frequency information of the second carrier and a frequency offset of the first BWP; the first indication includes frequency information of an SSB of the cell of the second carrier, a first parameter, and a frequency offset of the first BWP, where the first parameter is for determining a starting frequency location of a bandwidth of the second carrier; or the first indication includes a frequency location of the first BWP.

Optionally, the transceiver unit 1701 is further configured to receive a second indication in the cell of the first carrier, where the second indication indicates that the first message is broadcast in the cell of the first carrier, and the second indication is carried in a master information block MIB or a system information block SIB.

It may be understood that the apparatus 1700 may correspond to the method of the terminal device in the foregoing method embodiment, for example, the method in FIG. 2. In addition, the foregoing and other management operations and/or functions of the units in the apparatus 1700 are separately used to implement corresponding steps of the method of the terminal device in the foregoing method embodiment. Therefore, beneficial effects in the foregoing method embodiment can also be implemented. For brevity, details are not described herein again.

In another possible implementation, the apparatus 1700 may include: the processing unit 1702, configured to generate a first message, where the first message includes remaining minimum system information RMSI of a cell of a second carrier and a first indication, and the first indication indicates information about a first bandwidth part BWP; and the transceiver unit 1701, configured to broadcast the first message on a first carrier.

Optionally, the cell of the first carrier is not in an energy saving state, and the cell of the second carrier is in the energy saving state.

Optionally, the first message further includes identification information of the cell of the second carrier.

Optionally, the first indication includes frequency information of the second carrier and a frequency offset of the first BWP; the first indication includes frequency information of an SSB of the cell of the second carrier, a first parameter, and a frequency offset of the first BWP, where the first parameter is for determining a starting frequency location of a bandwidth of the second carrier; or the first indication includes a frequency location of the first BWP.

Optionally, the transceiver unit 1701 is further configured to broadcast a second indication on the first carrier, where the second indication indicates that the first message is broadcast in the cell of the first carrier, and the second indication is carried in a master information block (MIB) or a system information block (SIB).

It may be understood that the apparatus 1700 may correspond to the method of the network device in the foregoing method embodiment, for example, the method in FIG. 2. In addition, the foregoing and other management operations and/or functions of the units in the apparatus 1700 are separately used to implement corresponding steps of the method of the network device in the foregoing method embodiment. Therefore, beneficial effects in the foregoing method embodiment can also be implemented. For brevity, details are not described herein again.

In still another possible implementation, the apparatus 1700 may include: the transceiver unit 1701, configured to receive a second message in a cell of a first carrier, where the second message includes remaining minimum system information (RMSI) of a cell of a second carrier and information about a synchronization signal and PBCH block SSB of the cell of the second carrier; and the processing unit 1702, configured to access the cell of the second carrier based on the RMSI and the information about the SSB. Optionally, the processing unit 1702 is further configured to detect the SSB based on the information about the SSB.

Optionally, the cell of the first carrier is not in an energy saving state, and the cell of the second carrier is in the energy saving state.

Optionally, the information about the SSB includes one or more of the following: a period of the SSB, a frequency of the SSB, and a carrier spacing of the SSB.

Optionally, the second message further includes identification information of the cell of the second carrier. That the processing unit 1702 is configured to access the cell of the second carrier based on the RMSI and the SSB includes: accessing the cell of the second carrier based on the RMSI, the SSB, and the identification information.

Optionally, the transceiver unit 1702 is further configured to receive a third indication in the cell of the first carrier, where the third indication indicates that the second message is broadcast in the cell of the first carrier, and the third indication is carried in a master information block (MIB) or a system information block (SIB).

It may be understood that the apparatus 1700 may correspond to the method of the terminal device in the foregoing method embodiment, for example, the method in FIG. 4. In addition, the foregoing and other management operations and/or functions of the units in the apparatus 1700 are separately used to implement corresponding steps of the method of the terminal device in the foregoing method embodiment. Therefore, beneficial effects in the foregoing method embodiment can also be implemented. For brevity, details are not described herein again.

In still another possible implementation, the apparatus 1700 may include: the processing unit 1702, configured to generate a second message, where the second message includes remaining minimum system information (RMSI) of a cell of a second carrier and information about a synchronization signal and PBCH block SSB of the cell of the second carrier; and the transceiver unit 1701, configured to broadcast the second message on a first carrier.

Optionally, the cell of the first carrier is not in an energy saving state, and the cell of the second carrier is in the energy saving state.

Optionally, the information about the SSB includes one or more of the following: a period of the SSB, a frequency of the SSB, and a carrier spacing of the SSB.

Optionally, the second message further includes identification information of the cell of the second carrier.

Optionally, the transceiver unit 1701 is further configured to broadcast a third indication on the first carrier, where the third indication indicates that the second message is broadcast in the cell of the first carrier, and the third indication is carried in a master information block (MIB) or a system information block (SIB).

It may be understood that the apparatus 1700 may correspond to the method of the network device in the foregoing method embodiment, for example, the method in FIG. 4. In addition, the foregoing and other management operations and/or functions of the units in the apparatus 1700 are separately used to implement corresponding steps of the method of the network device in the foregoing method embodiment. Therefore, beneficial effects in the foregoing method embodiment can also be implemented. For brevity, details are not described herein again.

Figure 6:
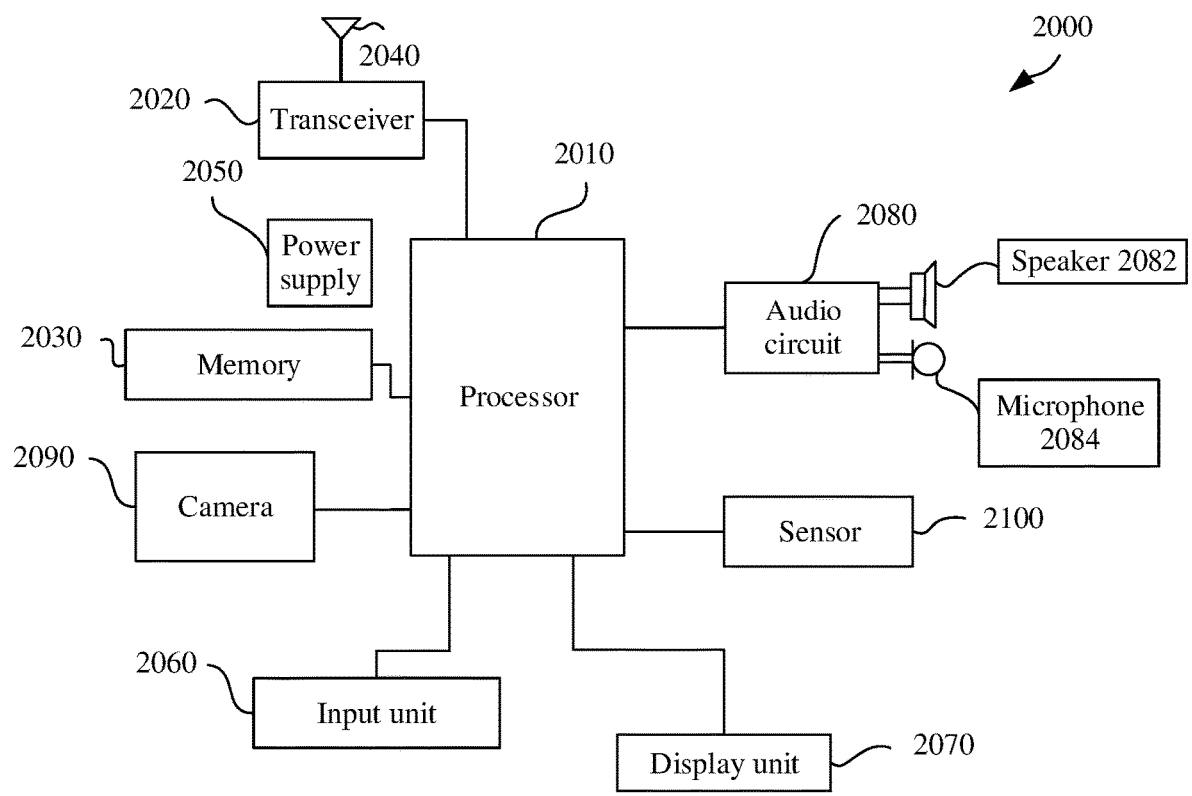
FIG. 6 is a schematic diagram of a structure of a terminal device according to an embodiment of this application.

FIG. 6 is a schematic diagram of a structure of the terminal device 2000 according to an embodiment of this application. The terminal device 2000 may be used in the system shown in FIG. 1, to perform functions of the terminal device in the foregoing method embodiments. As shown in FIG. 6, the terminal device 2000 includes the processor 2010 and the transceiver 2020. Optionally, the terminal device 2000 further includes a memory 2030. The processor 2010, the transceiver 2002, and the memory 2030 may communicate with each other through an internal connection path, to transfer a control signal or a data signal. The memory 2030 is configured to store a computer program. The processor 2010 is configured to invoke the computer program from the memory 2030 and run the computer program, to control the transceiver 2020 to receive and send a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030, to implement the foregoing functions. During specific implementation, the memory 2030 may alternatively be integrated into the processor 2010, or may be independent of the processor 2010. The processor 2010 may correspond to the processing unit 1702 in FIG. 5.

The transceiver 2020 may correspond to the transceiver unit 1701 in FIG. 5. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that the terminal device 2000 shown in FIG. 6 can implement the processes of the terminal device (the first terminal device) in the method embodiments shown in FIG. 2 or FIG. 4. Operations or functions of modules in the terminal device 2000 are separately intended to implement corresponding processes in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments. The transceiver 2020 may be configured to perform a sending action by the terminal device for the network device or a receiving operation from the network device in the foregoing method embodiments. For details, refer to the descriptions in the foregoing method embodiments. Details are not described herein again.

Optionally, the terminal device 2000 may further include a power supply 2050, configured to supply power to various components or circuits in the terminal device.

In addition, to improve the functions of the terminal device, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

It may be understood that the structure of the terminal device shown in FIG. 6 is merely a possible form, and should not constitute any limitation on embodiments of this application. This application does not exclude a possibility that there may be a terminal device structure in another form in the future.

Figure 7:
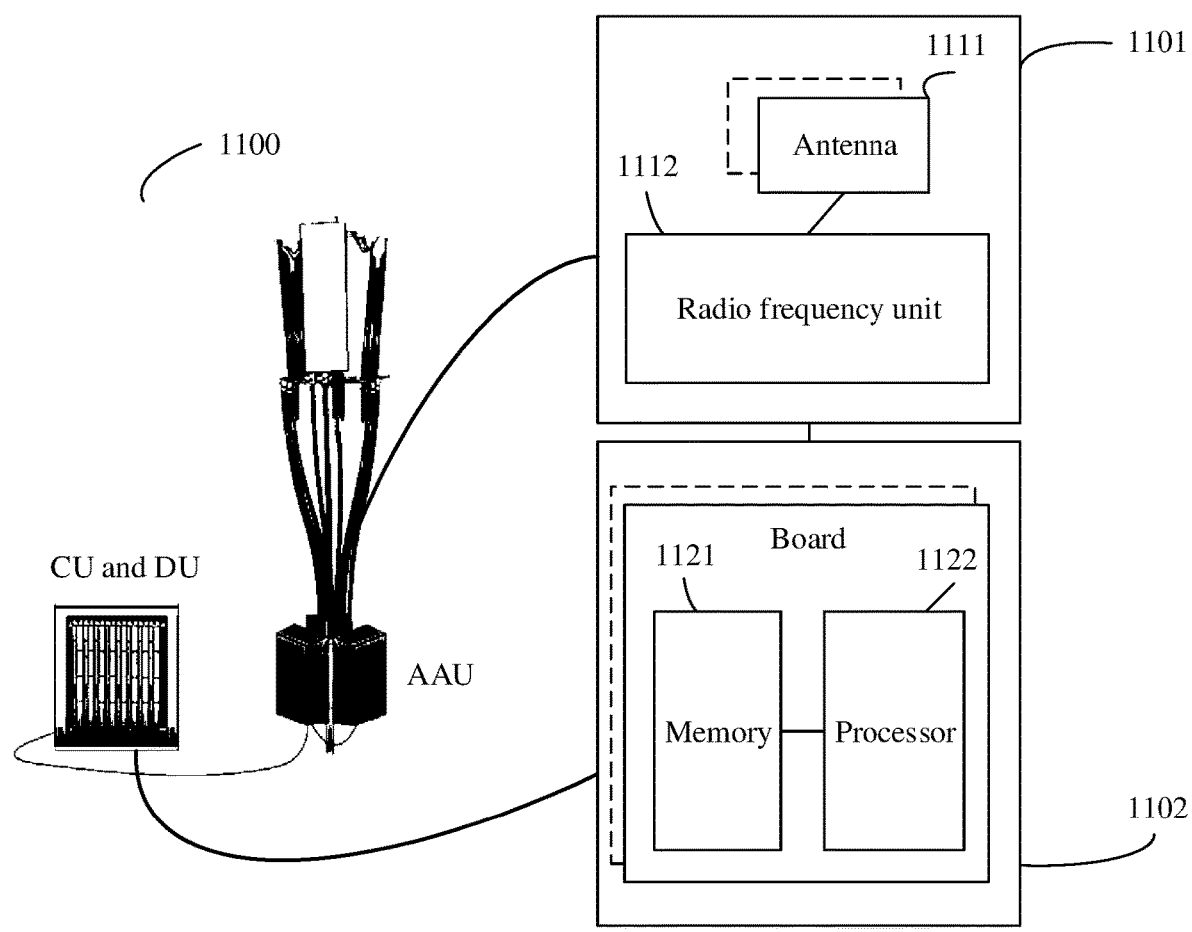
FIG. 7 is a schematic diagram of a structure of a network device according to an embodiment of this application.

FIG. 7 is a schematic diagram of a structure of the network device 1100 according to an embodiment of this application. The network device 1100 may be applied to the system shown in FIG. 1.

In a 5G communication system, the network device 1100 may include a CU, a DU, and an active antenna unit (AAU). The CU and the DU may communicate with each other through an interface. A control plane (CP) interface may be Fs-C, for example, F1-C, and a user plane (UP) interface may be Fs-U, for example, F1-U.

The CU, the DU, and the AAU may be separated or integrated. Therefore, there are a plurality of network deployment forms. A possible deployment form in which the CU and the DU are co-deployed on hardware is shown in FIG. 7. It should be understood that, FIG. 7 is merely an example, and constitutes no limitation on the protection scope of this application. For example, a deployment form may alternatively be that DUs are deployed in a 5G BBU equipment room, CUs or DUs are deployed together, or CUs are centralized at a higher level.

The AAU may implement a transceiver function, which is referred to as a transceiver unit 1101, and corresponds to the transceiver unit 1701 in FIG. 5. The AAU is mainly configured to: send and receive a radio frequency signal, and perform conversion between the radio frequency signal and a baseband signal. For example, the AAU is configured to send the message or information in the foregoing embodiments to a terminal device. Optionally, the transceiver unit 1101 may also be referred to as a transceiver machine, a transceiver circuit, a transceiver, or the like, and may include at least one antenna 1111 and a radio frequency unit 1112. Optionally, the transceiver unit 1101 may include a receiving unit and a sending unit. The receiving unit may correspond to a receiver (or referred to as a receiver machine or a receiver circuit), and the sending unit may correspond to a transmitter (or referred to as a transmitter machine or a transmitter circuit). The AAU is mainly configured to: receive and send a radio frequency signal, and perform conversion between a radio frequency signal and a baseband signal, for example, configured to send control information in the foregoing embodiments to a terminal device. The CU and the DU may implement an internal processing function, and are referred to as a processing unit 1102, which is configured to perform baseband processing, control a base station, and the like. The AAU and the CU together with the DU may be physically disposed together, or may be physically disposed separately, that is, a distributed base station.

The CU and the DU are a control center of the network device, and may also be referred to as a processing module (or a processing unit). The CU and the DU may correspond to the processing unit 1702, and are mainly configured to implement a baseband processing function such as channel encoding, multiplexing, modulation, and spreading. For example, the CU and the DU (the processing unit 1702) 1102 may be used by the network device 1100 to perform an operation procedure related to the network device in the foregoing method embodiments.

In an example, the CU and the DU may include one or more boards, and a plurality of boards may together support a radio access network (for example, an LTE system, or a 5G system) of a single access standard, or may separately support radio access networks of different access standards. The CU and the DU further include a memory 1121 and a processor 1122. The memory 1121 is configured to store necessary instructions and data. The processor 1122 is configured to control the base station to perform a necessary action, for example, configured to control the base station to perform an operation procedure related to the network device in the foregoing method embodiments. The memory 1121 and the processor 1122 may serve one or more boards. In other words, a memory and a processor may be disposed on each board. Alternatively, a plurality of boards may share a same memory and a same processor. In addition, a necessary circuit may further be disposed on each board.

The CU and the DU 1102 may be configured to perform an action that is implemented inside the network device and that is described in the foregoing method embodiments, and the AAU may be configured to perform an action of receiving or sending that is performed by the network device from or to the terminal device and that is described in the foregoing method embodiments. For details, refer to the descriptions in the foregoing method embodiments. Details are not described herein again.

In addition, the network device is not limited to the form shown in FIG. 7, and may alternatively be in another form. For example, the network device includes a BBU and an adaptive radio unit (ARU), or includes a BBU and an active antenna unit (AAU), or may be customer premises equipment (CPE), or may be in another form. This is not limited in this application.

It should be understood that the network device 1100 shown in FIG. 7 can implement functions of the network device in the foregoing method embodiments (for example, FIG. 2 to FIG. 4). Operations and/or functions of the units in the network device 1100 are used to implement a corresponding procedure performed by the network device in the foregoing method embodiment. To avoid repetition, detailed descriptions are appropriately omitted herein. The structure of the network device shown in FIG. 7 is merely a possible form, and should not constitute any limitation on embodiments of this application. This application does not exclude a possibility that there may be a network device structure in another form in the future.

It should be understood that the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, a discrete hardware component, a system on chip (SoC), a central processing unit (CPU), a network processor (NP), a digital signal processor (DSP), a micro controller unit (MCU), a programmable logic device (PLD), or another integrated chip. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished through a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The technologies described in this application may be implemented in various manners. For example, the technologies may be implemented by hardware, software, or a combination thereof. For hardware implementation, a processing unit configured to perform these technologies at a communication apparatus (for example, a base station, a terminal, a network entity, or a chip) may be implemented in one or more general-purpose processors, a DSP, a digital signal processor, an ASIC, a programmable logic device, an FPGA or another programmable logic apparatus, a discrete gate or transistor logic device, a discrete hardware component, or any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

This application further provides a computer-readable storage medium. The computer-readable storage medium stores a computer program. When the computer program is executed by a computer, a function in any one of the foregoing method embodiments is implemented.

This application further provides a computer program product. When the computer program product is executed by a computer, functions of any one of the foregoing method embodiments are implemented.

According to the methods provided in the embodiments of this application, this application further provides a system, including the foregoing terminal device and the foregoing network device.

This application further provides a chip including a processor. The processor is configured to read and run a computer program stored in a memory, to perform a corresponding operation and/or procedure performed by the terminal device in the cell access method according to this application. Optionally, the chip further includes the memory. The memory is connected to the processor by using a circuit or a wire. The processor is configured to read and execute the computer program stored in the memory. Further, optionally, the chip further includes a communication interface, and the processor is connected to the communication interface. The communication interface is configured to receive data and/or information (or a message) that needs to be processed. The processor obtains the data and/or the information (or the message) from the communication interface, and processes the data and/or the information (or the message). The communication interface may be an input/output interface.

This application further provides a chip including a processor. The processor is configured to invoke and run a computer program stored in a memory, to perform a corresponding operation and/or procedure performed by the network device in the cell access method according to this application. Optionally, the chip further includes the memory. The memory is connected to the processor by using a circuit or a wire. The processor is configured to read and execute the computer program stored in the memory. Further, optionally, the chip further includes a communication interface, and the processor is connected to the communication interface. The communication interface is configured to receive data and/or information that needs to be processed. The processor obtains the data and/or the information from the communication interface, and processes the data and/or the information. The communication interface may be an input/output interface.

It should be understood that, an "embodiment" mentioned throughout this specification means that particular features, structures, or characteristics related to this embodiment are included in at least one embodiment of this application. Therefore, embodiments in the entire specification do not necessarily refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

It should be further understood that, in this application, "when" and "if" mean that UE or a base station performs corresponding processing in an objective situation, but do not constitute any limitation on time, do not require the UE or the base station to perform a determining action during implementation, and do not mean other limitations either.

A person of ordinary skill in the art may understand that various numerals such as "first" and "second" in this application are merely used for differentiation for ease of description, and are not used to limit the scope of embodiments of this application or represent a sequence.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" may be used interchangeably in this specification. The term "and/or" in this specification describes only an association relationship between associated objects and represents that three relationships may exist. For example, A and/or B may represent the following three cases: only A exists, both A and B exist, and only B exists. A may be singular or plural, and B may be singular or plural.

The character "/" generally indicates an "or" relationship between the associated objects.

The term "at least one of" in this specification indicates all or any combination of listed items. For example, "at least one of A, B, and C" may indicate the following six cases: Only A exists, only B exists, only C exists, both A and B exist, both B and C exist, and A, B, and C exist. A may be singular or plural, B may be singular or plural, and C may be singular or plural.

It should be understood that in embodiments of this application, "B corresponding to A" indicates that B is associated with A, and B may be determined based on A. However, it should be further understood that determining B based on A does not mean that B is determined based only on A. B may alternatively be determined based on A and/or other information.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory, (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A cell access method, comprising:
   receiving, by a terminal device, a first message in a cell of a first carrier, wherein the first message comprises remaining minimum system information (RMSI) of a cell of a second carrier and a first indication, and the first indication indicates information about a first bandwidth part (BWP); and
   accessing, by the terminal device, the cell of the second carrier based on the first BWP and the RMSI.

2. The cell access method according to claim 1, wherein the cell of the first carrier is not in an energy saving state, and the cell of the second carrier is in the energy saving state.

3. The cell access method according to claim 1, wherein:
   the first message further comprises identification information of the cell of the second carrier; and
   the accessing, by the terminal device, the cell of the second carrier based on the first BWP and the RMSI comprises:
      accessing, by the terminal device, the cell of the second carrier based on the first BWP, the RMSI, and the identification information.

4. The cell access method according to claim 1, wherein:
   the first indication comprises frequency information of a synchronization signal and physical broadcast channel block (SSB) of the cell of the second carrier, a first parameter used to determine a starting frequency location of a bandwidth of the second carrier, and a frequency offset of the first BWP.

5. The cell access method according to claim 1, wherein the method further comprises:
   receiving, by the terminal device, a second indication in the cell of the first carrier, wherein the second indication indicates that the first message is broadcast in the cell of the first carrier, and wherein the second indication is carried in a master information block (MIB) or a system information block (SIB).

6. A cell access apparatus, comprising:
   a transceiver, configured to receive a first message in a cell of a first carrier, wherein the first message comprises remaining minimum system information (RMSI) of a cell of a second carrier and a first indication, and the first indication indicates information about a first bandwidth part (BWP);
   at least one processor; and
   one or more memories coupled to the at least one processor and storing programming instructions for execution by the at least one processor to access the cell of the second carrier based on the first BWP and the RMSI.

7. The cell access apparatus according to claim 6, wherein the cell of the first carrier is not in an energy saving state, and the cell of the second carrier is in the energy saving state.

8. The cell access apparatus according to claim 6, wherein:
the first message further comprises identification information of the cell of the second carrier; and
accessing the cell of the second carrier based on the first BWP and the RMSI comprises:
accessing the cell of the second carrier based on the first BWP, the RMSI, and the identification information.

9. The cell access apparatus according to claim 6, wherein:
the first indication comprises frequency information of a synchronization signal and physical broadcast channel block (SSB) of the cell of the second carrier, a first parameter used to determine a starting frequency location of a bandwidth of the second carrier, and a frequency offset of the first BWP.

10. The cell access apparatus according to claim 6, wherein the transceiver is further configured to receive a second indication in the cell of the first carrier, wherein the second indication indicates that the first message is broadcast in the cell of the first carrier, and wherein the second indication is carried in a master information block (MIB) or a system information block (SIB).

11. A cell access apparatus, comprising:
at least one processor;
one or more memories coupled to the at least one processor and storing programming instructions for execution by the at least one processor to generate a first message, wherein the first message comprises remaining minimum system information (RMSI) of a cell of a second carrier and a first indication, and the first indication indicates information about a first bandwidth part (BWP); and
a transceiver, configured to broadcast the first message on a first carrier.

12. The cell access apparatus according to claim 11, wherein a cell of the first carrier is not in an energy saving state, and the cell of the second carrier is in the energy saving state.

13. The cell access apparatus according to claim 11, wherein the first message further comprises identification information of the cell of the second carrier.

14. The cell access apparatus according to claim 11, wherein:
the first indication comprises frequency information of a synchronization signal and physical broadcast channel block (SSB) of the cell of the second carrier, a first parameter used to determine a starting frequency location of a bandwidth of the second carrier, and a frequency offset of the first BWP.

15. The cell access apparatus according to claim 11, wherein the transceiver is further configured to broadcast a second indication on the first carrier, wherein the second indication indicates that the first message is broadcast in the cell of the first carrier, and wherein the second indication is carried in a master information block (MIB) or a system information block (SIB).

16. The cell access method according to claim 1, wherein the first indication comprises frequency information of the second carrier and a frequency offset of the first BWP.

17. The cell access method according to claim 1, wherein the first indication comprises a frequency location of the first BWP.

18. The cell access apparatus according to claim 6, wherein the first indication comprises frequency information of the second carrier and a frequency offset of the first BWP.

19. The cell access apparatus according to claim 6, wherein the first indication comprises a frequency location of the first BWP.

20. The cell access apparatus according to claim 11, wherein the first indication comprises frequency information of the second carrier and a frequency offset of the first BWP.

* * * * *